US007990816B2

United States Patent
Uchida et al.

(10) Patent No.: US 7,990,816 B2
(45) Date of Patent: Aug. 2, 2011

(54) OPTICAL DISK APPARATUS

(75) Inventors: Shigeru Uchida, Higashihiroshima (JP); Yoshinori Kajiwara, Iwakuni (JP); Makoto Horiyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 821 days.

(21) Appl. No.: 11/271,914

(22) Filed: Nov. 14, 2005

(65) Prior Publication Data
US 2006/0109758 A1 May 25, 2006

(30) Foreign Application Priority Data

Nov. 19, 2004 (JP) ................................ 2004-335776

(51) Int. Cl.
*G11B 7/00* (2006.01)
(52) U.S. Cl. ..................................... 369/44.28
(58) Field of Classification Search .................. None
See application file for complete search history.

(56) References Cited

U.S. PATENT DOCUMENTS

| 5,341,353 | A | 8/1994 | Yoshio et al. | |
|---|---|---|---|---|
| 5,442,604 | A | 8/1995 | Osada et al. | |
| 5,499,223 | A * | 3/1996 | Yanagi et al. | 369/44.28 |
| 6,044,050 | A * | 3/2000 | Kuroiwa | 369/44.41 |
| 6,442,111 | B1 | 8/2002 | Takahashi et al. | |
| 6,459,663 | B1 * | 10/2002 | Hayami | 369/44.29 |
| 2003/0210619 | A1 * | 11/2003 | Kishimoto et al. | 369/44.29 |
| 2004/0066715 | A1 * | 4/2004 | Buchler | 369/44.29 |
| 2005/0163000 | A1 * | 7/2005 | Nishikawa | 369/44.37 |

FOREIGN PATENT DOCUMENTS

| JP | 59-084353 | A | 5/1984 |
|---|---|---|---|
| JP | 60-151879 | A | 8/1985 |
| JP | 5-109086 | A | 4/1993 |
| JP | 06-044585 | A | 2/1994 |
| JP | 6-168460 | A | 6/1994 |
| JP | 07-093764 | | 4/1995 |
| JP | 10-233020 | A | 9/1998 |
| JP | 11-312326 | | 11/1999 |
| JP | 2000-076669 | | 3/2000 |
| JP | 2001-250250 | * | 9/2001 |

* cited by examiner

*Primary Examiner* — Christopher R Lamb
(74) *Attorney, Agent, or Firm* — Birch, Stewart, Kolasch & Birch, LLP

(57) ABSTRACT

A conventional optical disk apparatus detects the amount of shift of an objective lens with a tracking error signal and an RF signal, and controls, when an optical pickup is moved, the shift amount for performing high-speed seek and high-speed access. The problem here is that this apparatus cannot be applied to an optical disk having an area where no RF signal is recorded, and requires higher costs. In view of this, an optical disk apparatus of the present invention has a shift signal detecting portion that detects a shift signal based on a push-pull signal generated during generation of a tracking error signal based on the reflected light resulting from a beam reflected from an optical disk, and a shift amount control portion that drives, when an optical pickup is moved, an objective lens actuator based on the shift signal detected by the shift signal detecting portion.

4 Claims, 6 Drawing Sheets

OPTICAL DISK APPARATUS

This nonprovisional application claims priority under 35 U.S.C. §119(a) on Patent Application No. 2004-335776 filed in Japan on Nov. 19, 2005, the entire contents of which are hereby incorporated by reference.

BACKGROUND OF THE INVENTION

1. Field of the Invention

The present invention relates to an apparatus that irradiates an optical disk serving as a recording medium with light, and thus reads a signal recorded therein.

2. Description of Related Art

During a seek operation for making access to a track of an optical disk located away from a track thereof that is being played at the moment, optical disk apparatuses turn off a tracking servo, and then perform an operation for moving an optical pickup at high speed in the direction of the radius of the optical disk. Conventionally, at the time of this operation, an objective lens is supported only by the force exerted by a spring, because the tracking servo is in an off state at this time, and therefore the objective lens vibrates due to sudden acceleration of the optical pickup. This makes, for example, a focus servo become disengaged, or delays the start of the tracking servo, because the vibration of the objective lens is not stopped instantly after the optical pickup has been moved. This makes it difficult to perform high-speed seek and high-speed access.

Therefore, for example, Japanese Patent Application Laid-Open No. S60-151879 discloses an optical disk playback apparatus that can switch the output impedance of a drive circuit that drives a drive coil for use in driving an objective lens actuator. This apparatus makes the output impedance of the drive circuit lower when the optical pickup is moved, so that the vibration of the objective lens actuator is clamped and reduced with a back electromotive force of the drive coil. This makes it possible to reduce the seek time and the access time.

However, the above-described method is not very effective in reducing the vibration, although it somewhat reduces the vibration of the objective lens that occurs when the optical pickup is moved. Thus, for example, what is disclosed in Japanese Patent Application Laid-Open No. S59-84353 detects the amount of shift of an objective lens with a sensor that detects the amount of shift of the objective lens, or, instead of using the sensor, by using a tracking error signal and an RF signal based on the reflected light resulting from a beam reflected from an optical disk, so that the amount of shift of the objective lens is controlled to a certain value during an operation for moving an optical pickup at high speed in the direction of the radius of the optical disk. With this method, it is possible to reduce the vibration of the objective lens that occurs when the optical pickup is moved to almost zero.

However, the above-described method using a sensor requires installation of a sensor and an extra circuit for processing a signal from the sensor. This leads to higher costs.

Moreover, the above-described method using a tracking error signal and an RF signal has the following disadvantages. When an optical disk has an area where no RF signal is recorded, no RF signal is detected, and therefore it is impossible to detect the amount of shift. Thus, with this method, it is impossible to control the amount of shift of the objective lens of the optical disk having an area where no RF signal is recorded. Furthermore, processing or the like of the RF signal requires a highly complicated circuit. This leads to higher costs.

SUMMARY OF THE INVENTION

It is an object of the present invention to provide an optical disk apparatus that can perform high-speed seek and high-speed access even on an optical disk having an area where no RF signal is recorded, and that can reduce costs greatly.

To achieve the above object, according to one aspect of the present invention, an optical disk apparatus is provided with: a light source; an optical pickup having an objective lens that condenses a beam emitted from the light source on an optical disk and an objective lens actuator that drives the objective lens; a sled mechanism that moves the optical pickup in the direction of the radius of the optical disk; an optical pickup moving portion that moves the optical pickup in the direction of the radius of the optical disk with the sled mechanism for making access to a seek target track on the optical disk; a shift signal detecting portion that detects a shift signal of the objective lens based on a push-pull signal, among signals based on the reflected light resulting from the beam reflected from the optical disk, the push-pull signal generated in the course of generating a tracking error signal based on the reflected light; and a shift amount control portion that drives, when the optical pickup moving portion operates, the objective lens actuator based on the shift signal detected by the shift signal detecting portion (hereinafter referred to as a first configuration).

With this configuration, a shift signal is detected from a push-pull signal. This makes detection of a shift signal possible even when the optical disk has an area where no RF signal is recorded, and thus makes it possible to control the shift amount of the objective lens. This makes it possible to perform high-speed seek and high-speed access even on an optical disk having an area where no RF signal is recorded. Moreover, there is no need to use an RF signal for detecting a shift signal. This eliminates the need to use a complicated processing circuit, and thus makes it possible to reduce costs greatly.

Moreover, according to another aspect of the present invention, the optical disk apparatus with the first configuration may be further provided with: a beam generating portion that generates, from the beam emitted from the light source, a main beam and at least one sub-beam, the main beam and the sub-beam being condensed by the objective lens on the optical disk; a main beam push-pull signal generating portion that generates, based on the reflected light resulting from the main beam reflected from the optical disk, a main beam push-pull signal containing a tracking error component and an offset component; a sub-beam push-pull signal generating portion that generates, based on the reflected light resulting from the sub-beam reflected from the optical disk, a sub-beam push-pull signal containing almost zero tracking error components but containing an offset component; and a tracking error signal generating portion that generates the tracking error signal based on the main beam push-pull signal and the sub-beam push-pull signal, and the shift signal detecting portion may detect the shift signal based on the sub-beam push-pull signal (hereinafter referred to as a second configuration).

With this configuration, a shift signal is detected based on a push-pull signal of the sub-beam. This makes detection of a shift signal possible even when the optical disk has an area where no RF signal is recorded, and thus makes it possible to control the shift amount of the objective lens. This makes it possible to perform high-speed seek and high-speed access even on an optical disk having an area where no RF signal is recorded.

Moreover, according to what is disclosed in Japanese Patent Application Laid-Open No. S59-84353, it is necessary to synthesize a tracking error signal and a signal based on an RF signal in the optimal ratio depending on the optical disk. Otherwise, noise appears in synchronous with a tracking error. This hinders accurate shift amount control. By contrast, according to the optical disk apparatus with the second configuration, such a problem does not occur, because it is possible to directly detect a shift signal from a sub-beam push-pull signal containing almost zero tracking error component but containing an offset component.

Furthermore, with the optical disk apparatus with the second configuration, it is possible to detect a correct shift signal of the objective lens regardless of the location of the sub-beam. This makes it possible to achieve satisfactory performance in shift amount control without adjusting the location of the sub-beam.

Moreover, according to still another aspect of the present invention, the optical disk apparatus with the first or second configuration may be further provided with: a tracking control portion that performs tracking control by driving the objective lens actuator based on the tracking error signal; and a switching portion that switches between the shift amount control portion and the tracking control portion (hereinafter referred to as a third configuration.

With this configuration, it is possible to suppress the vibration of the objective lens after the optical pickup is moved in a seek operation by controlling the shift amount of the objective lens. This makes it possible to start the tracking servo quickly and reliably by switching the objective lens control to the tracking servo.

Moreover, according to still another aspect of the present invention, the optical disk apparatus with one of the first to third configurations may be further provided with a tracking control portion that performs tracking control by driving the objective lens actuator based on the tracking error signal, and, when the tracking control is performed, the sled mechanism may be driven based on the shift signal (hereinafter referred to as a fourth configuration).

With this configuration, it is possible to control the objective lens at the time of a tracking servo in such a way that it is not deviated from the optical axis of the light source by using a shift signal of the objective lens that is detectable irrespective of the direction of gravity. This prevents the performance of the tracking servo from being degraded due to the direction in which the optical disk apparatus is mounted.

Moreover, according to still another aspect of the present invention, the optical disk apparatus with one of the first to fourth configurations may apply offset correction to the shift signal.

With this configuration, even when the accuracy with which the optical pickup is built is low, it is possible to detect a correct shift signal. This makes it practically possible to manufacture an optical disk apparatus.

DETAILED DESCRIPTION OF PREFERRED EMBODIMENTS

First Embodiment

Figure 1:
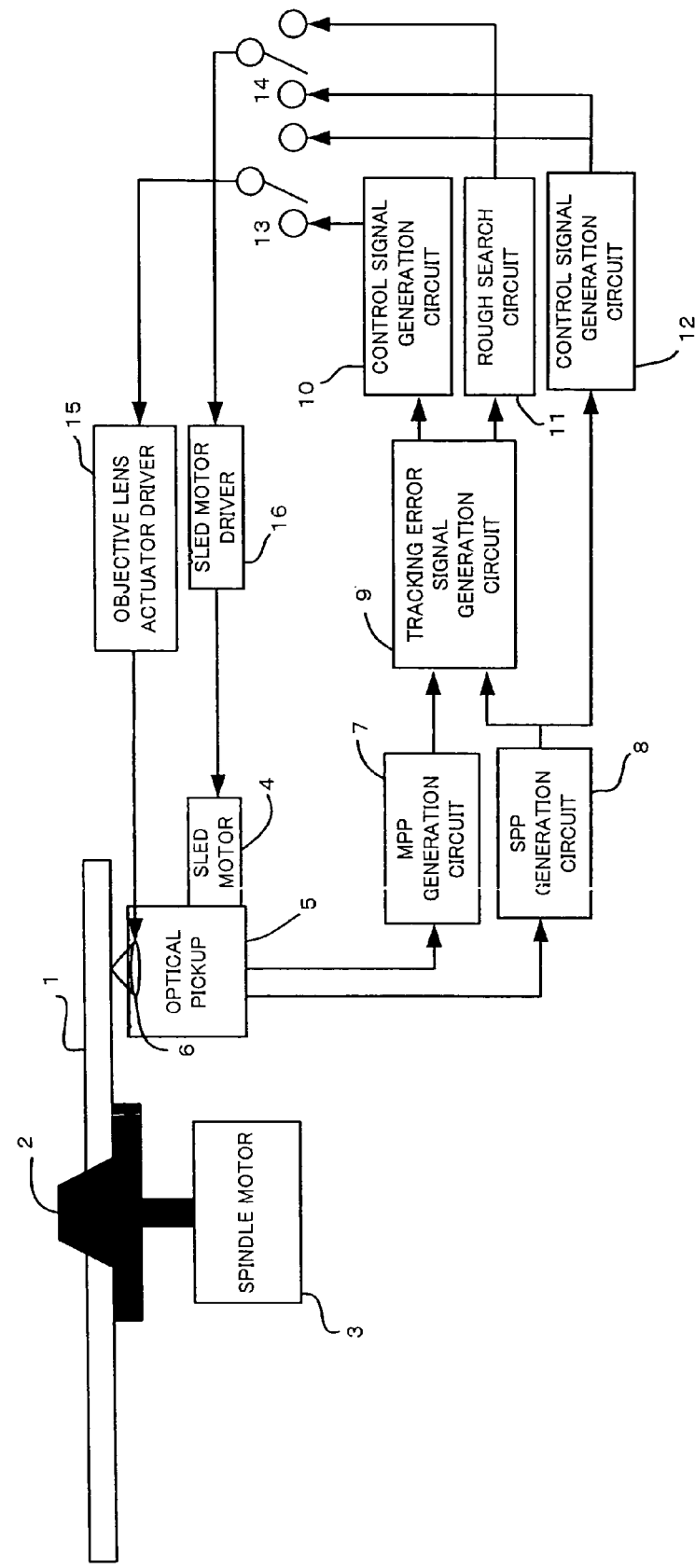
FIG. 1 is a diagram showing the configuration of the optical disk apparatus of a first embodiment of the present invention.

FIG. 1 shows the configuration of the optical disk apparatus using the phase shift DPP method of a first embodiment of the present invention. Note that FIG. 1 shows only the parts of the optical disk apparatus that are relevant to the present invention.

An optical disk 1 is rotating around an axis 2 of a spindle motor 3. A beam emitted from a light source inside an optical pickup 5 is condensed by an objective lens 6 on the rotating optical disk 1, and thereby the optical disk 1 is played back. A spindle motor 3 is controlled by a controller, which is not shown, in such a way that the optical disk 1 rotates at a constant linear velocity. There are provided, as a control actuator, an objective lens actuator, which is not shown, that operates the objective lens 6 inside the optical pickup 5, and a sled motor 4 that makes the optical pickup 5 move in the direction of the radius of the optical disk 1.

The reflecting light resulting from a main beam shone from the optical pickup 5 onto the optical disk 1 is detected by a two segment detector inside the optical pickup 5, and, based on the detection signal obtained therefrom, an MPP generation circuit 7 generates a main beam push-pull signal. This main beam push-pull signal contains a tracking error component and an offset component resulting from the shift of the objective lens.

Moreover, two sub-beams are shone from the optical pickup 5 onto the optical disk 1 at different positions away from the position where the main beam is shone onto the optical disk 1, and the reflecting light resulting from the sub-beams are detected by respective two segment detectors provided inside the optical pickup 5. Based on the detection signal obtained therefrom, an SPP generation circuit 8 generates a sub-beam push-pull signal. Here, the sub-beam push-pull signal is so processed, by a method which will be described below, as to contain almost zero tracking error components but only an offset component resulting from the shift of the objective lens.

A tracking error signal generation circuit 9 subtracts the sub-beam push-pull signal from the main beam push-pull signal in the ratio that permits cancellation of the offset component, and thereby generates a tracking error signal.

Moreover, the sub-beam push-pull signal generated by the SPP generation circuit 8 can be detected as a shift signal of the objective lens, because, as mentioned above, it is so processed as to contain almost zero tracking error components but only an offset component. Thus, it is possible to detect a shift signal from the sub-beam push-pull signal generated in the course of generating the tracking error signal.

The optical disk apparatus of this embodiment performs the following control by using the tracking error signal and the shift signal described above.

The optical pickup is first moved during a seek operation for making access to a track located away from the track that is being played at the moment. At this time, a switch 13 is switched to the output of a control signal generation circuit 12, and a switch 14 is switched to the output of a rough search circuit 11.

The rough search circuit 11 counts the number of zero crossings of the tracking error signal generated by the tracking error signal generation circuit 9, and makes the sled motor driver 16 drive the sled motor 4 until the count value reaches the number of tracks existing between the track that is being played at the moment and a seek target track, thereby making the optical pickup 5 move in the direction of the radius of the optical disk 1.

Meanwhile, the control signal generation circuit 12 generates a control signal so as to make a shift signal detected by the SPP generation circuit 8 equal to zero, then provides it to an objective lens actuator driver 15, and thereby drives the objective lens actuator inside the optical pickup 5. This makes it possible to reduce the vibration of the objective lens 6 that occurs during the movement of the optical pickup to almost zero.

When the counted number of zero crossings of the tracking error signal reaches the number of tracks existing between the track that is being played at the moment and the seek target track, the movement of the optical pickup 5 is stopped. At this time, the switch 13 is switched to the output of the control signal generation circuit 10, and the switch 14 is switched to the output of the control signal generation circuit 12.

Then, the control signal generation circuit 10 generates a control signal so as to make a tracking error signal generated by the tracking error signal generation circuit 9 equal to zero, then provides it to the objective lens actuator driver 15, and thereby drives the objective lens actuator inside the optical pickup 5. By driving the objective lens actuator in this way, a tracking servo is performed. At this time, the vibration of the objective lens 6 is suppressed. This makes it possible to start the tracking servo quickly.

Meanwhile, the control signal generation circuit 12 generates a control signal so as to make a shift signal detected by the SPP generation circuit 8 equal to zero, then provides it to the sled motor driver 16, and thereby drives the sled motor 4. This makes the optical pickup 5 move in the direction of the radius of the optical disk 1. In this way, the objective lens 6 is so controlled that it is located on the optical axis of the light source, which is an optically optimal shift position.

After the tracking servo is started, if the current position does not match the seek target track, a so-called precise search is further performed to make access to the seek target track.

When a tracking servo is performed after access to the seek target track is made, sled control is so performed as to make the above-described shift signal equal to zero.

Note that the control signal generation circuit 12 includes a correction circuit that corrects an offset of a shift signal ascribable to factors such as the accuracy with which the objective lens 6 and a photosensitive element inside the optical pickup 5 are fitted relatively each other. For example, by digitalizing, with an AD converter, a shift signal in a state where the amount of shift of the objective lens 6 is zero and previously storing it as an offset in a memory, which is not shown, the control signal generation circuit 12 reads the stored offset from the memory at the point of use, and corrects the shift signal.

Figure 2A:
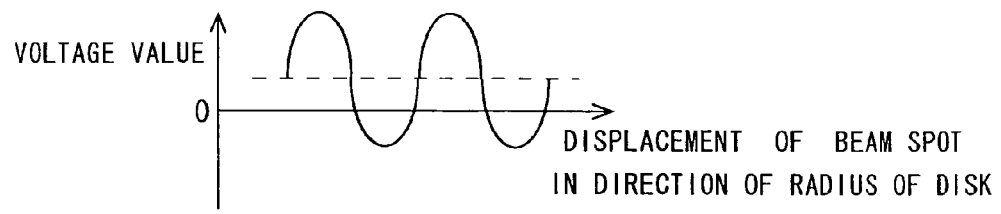
FIG. 2A is a diagram showing a main beam push-pull signal in the phase shift DPP method.
Figure 2B:
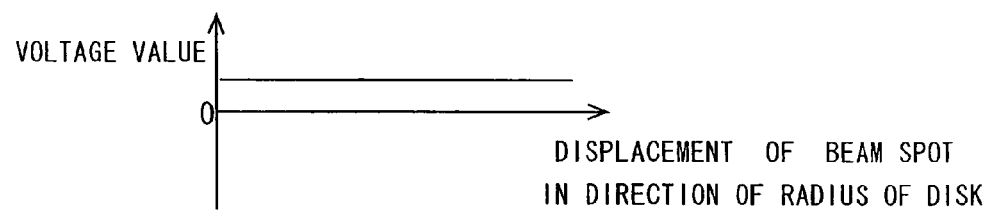
FIG. 2B is a diagram showing a sub-beam push-pull signal in the phase shift DPP method.
Figure 2C:
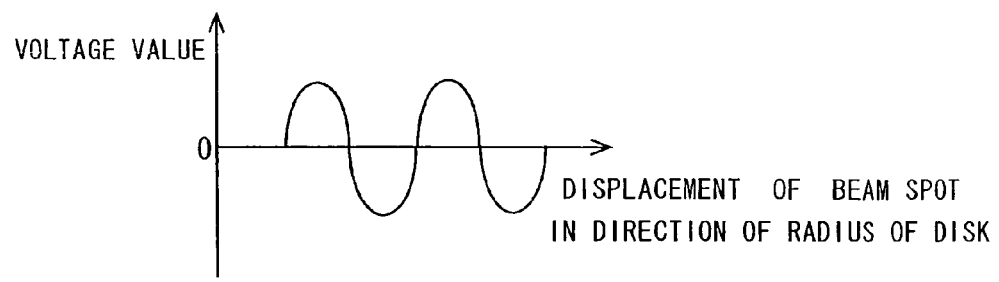
FIG. 2C is a diagram showing a tracking error signal in the phase shift DPP method.

Next, the phase shift DPP method used in this embodiment will be described. FIGS. 2A, 2B, and 2C show the detection signals in the phase shift DPP method. As shown in FIG. 2B, the sub-beam push-pull signal is so processed as to contain almost zero tracking error components regardless of the position of the sub-beam. This makes it possible to detect the tracking error signal shown in FIG. 2C by subtracting the sub-beam push-pull signal (FIG. 2B) from the main beam push-pull signal (FIG. 2A) in the ratio that permits cancellation of the offset component. Moreover, the sub-beam push-pull signal (FIG. 2B) contains only an offset component. This makes it possible to directly detect the sub-beam push-pull signal as a shift signal.

As described above, the sub-beam push-pull signal is so processed as to contain zero tracking error components regardless of the position of the sub-beam. This makes it possible to obtain the sub-beam push-pull signal shown in FIG. 2B that contains only an offset component regardless of the location of the sub-beam. Therefore, it is possible to detect a shift signal without adjusting the location of the sub-beam. Here, as a method of processing the sub-beam push-pull signal so as to contain almost zero tracking error components, a method is adopted that gives a phase difference to part of the sub-beam. This method will be described below.

Figure 3A:
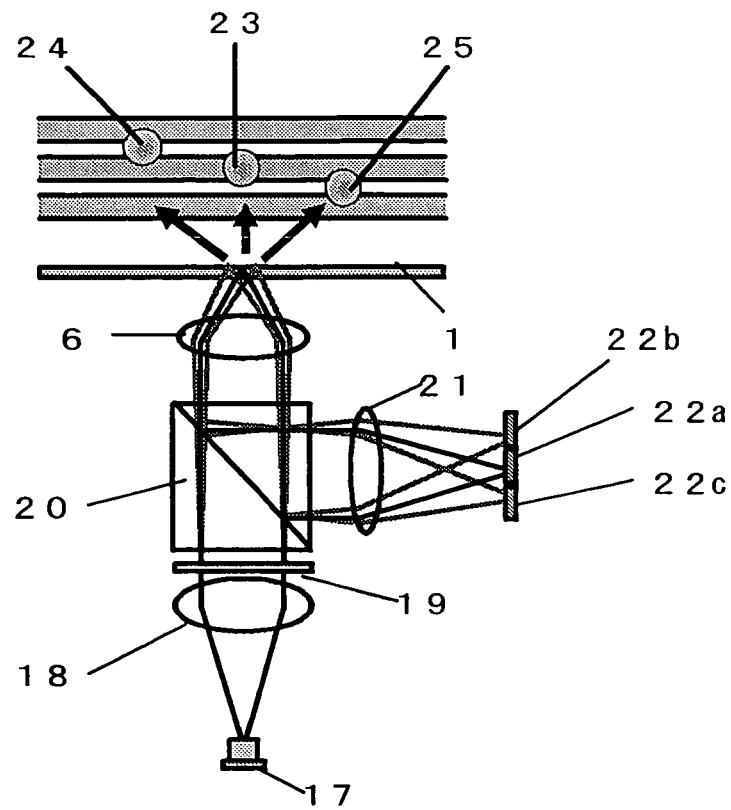
FIG. 3A is an illustration showing the inner configuration of the optical pickup included in the optical disk apparatus of the first embodiment.
Figure 3B:
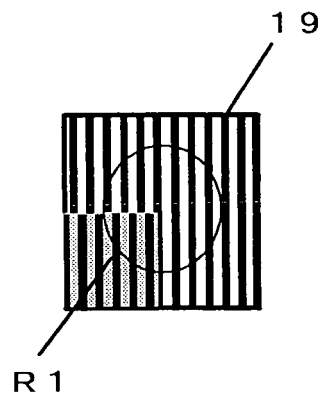
FIG. 3B is an illustration showing the diffraction grating of the optical disk apparatus of the first embodiment.

FIG. 3A shows the inner configuration of the optical pickup 5. A laser beam emitted from a laser diode 17 is incident on a diffraction grating 19 via a collimator lens 18. The diffraction grating 19 generates, from the incident laser beam, one main beam of light of order 0 and two sub-beams of light of order 1. These main beam and sub-beams thus generated are, after passing through a beam splitter 20, condensed by the objective lens 6, thereby forming a main beam spot 23 and sub-beam spots 24 and 25 on the optical disk 1. The light reflected from the optical disk 1 passes through the objective lens 6 and the beam splitter 20, and is then condensed by the condenser lens 21 on a main beam two segment detector 22a and sub-beam two segment detectors 22b and 22c, whereby a detection signal is obtained therefrom. Here, as shown in FIG. 3B, the diffraction grating 19 varies slits in a phase shift region R1 so that a one-fourth region of the sub-beam is 180 degrees out of phase with the rest thereof.

Figure 4:
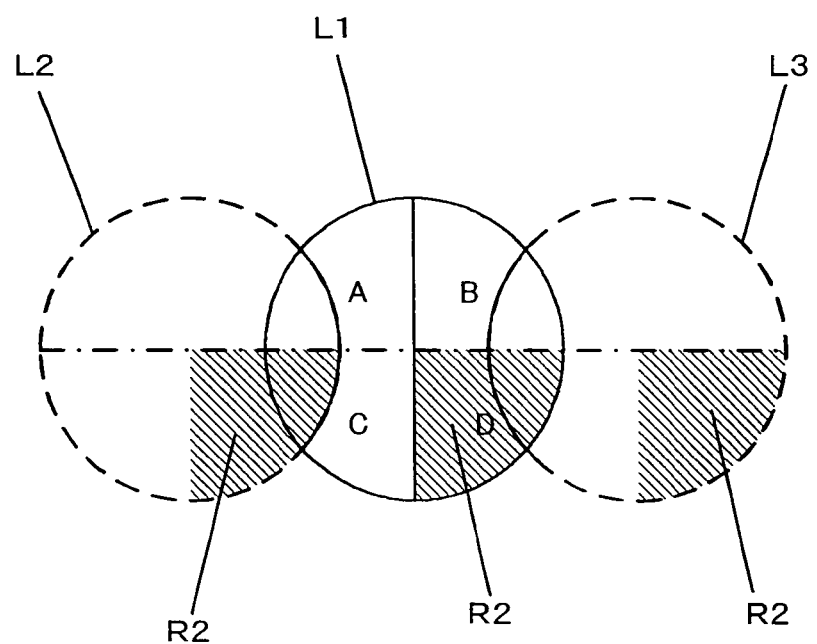
FIG. 4 is an illustration showing how the sub-beam two segment detector receives light.

FIG. 4 shows how the sub-beam two segment detector 22b (FIG. 3A) or 22c (FIG. 3A) detects light. Of the reflected light resulting from the sub-beam, light L1 of order 0, light L2 of order −1, and light L3 of order +1 are detected in an overlapping manner, and a region of the light L1 of order of 0 serves as a light detection region. The diffraction grating 19 (FIG. 3A) described above makes a one-fourth region R2 of each reflected light 180 degrees out of phase with the rest thereof. Suppose that, as shown in FIG. 4, the light detection region is divided into four regions (A, B, C, and D). Then, the amounts of light in these regions are given by formulae (1) to (4) noted below. Note that Ii (i represents each region) represents the amount of light in each region, $E_0$ represents the amplitude of the light of order 0, $E_1$ represents the amplitude of the light of order of ±1, $\phi_1$ represents a phase difference (which relates to the track depth) between the light of order of 0 and the light of order of ±1, x represents the amount of displacement of a beam spot from the center of the tracks, p represents a pitch of the track, $S_0$ represents an area of a region, which is included in the one-fourth region of the light detection region, where only the light of order of 0 exists, and $S_1$ represents an area of a region, which is included in the one-fourth region of the light detection region, where the light of order of 0 and the light of order of ±1 overlap one another.

Thus, a push-pull signal corresponding to the difference in the amount of detected light when the light detection region is divided into two regions is made equal to zero, as derived from formula (5), regardless of the position of the sub-beam spot. In this push-pull signal, when the objective lens is shifted, there appears only an offset component corresponding to the amount of shift.

$$I_A = S_0|E_0 \cdot \exp(2\pi i)|^2 + S_1|E_0 \cdot \exp(2\pi i) + E_1 \cdot \exp\{(\phi_1 - 2\pi x/p)i\}|^2 \quad (1)$$

$$I_B = S_0|E_0 \cdot \exp(2\pi i)|^2 + S_1|E_0 \cdot \exp(2\pi i) + E_1 \cdot \exp\{(\phi_1 + 2\pi x/p)i\}|^2 \quad (2)$$

$$I_C = S_0|E_0 \cdot \exp(2\pi i)|^2 + S_1|E_0 \cdot \exp(2\pi i) + E_1 \cdot \exp\{(\phi_1 - 2\pi x/p + \pi)i\}|^2 \quad (3)$$

$$I_D = S_0|E_0 \cdot \exp\{(2\pi + \pi)i\}|^2 = S_1|E_0 \cdot \exp\{(2\pi + \pi)i\} + E_1 \cdot \exp\{(\phi_1 + 2\pi x/p)i\}|^2 \quad (4)$$

$$SPP = (I_B - I_A) + (I_D - I_C) = 0 \quad (5)$$

The method described above makes it possible to process the sub-beam push-pull signal generated by the SPP generation circuit 8 (FIG. 1) based on an electrical signal from the sub-beam two segment detectors 22b (FIG. 3A) and 22c (FIG. 3A) so as to contain almost zero tracking error components regardless of the position of the sub-beam, and thus makes the sub-beam push-pull signal contain only an offset component proportional to the amount of shift of the objective lens. This makes it possible to detect the sub-beam push-pull signal as a shift signal. By using the shift signal thus detected to perform the control of the vibration of the objective lens when the optical pickup is moved at the time of a seek operation, and the sled control of the optical pickup at the time of a tracking servo, it is possible to perform the seek operation and the tracking servo with higher performance than ever.

Second Embodiment

Figure 5:
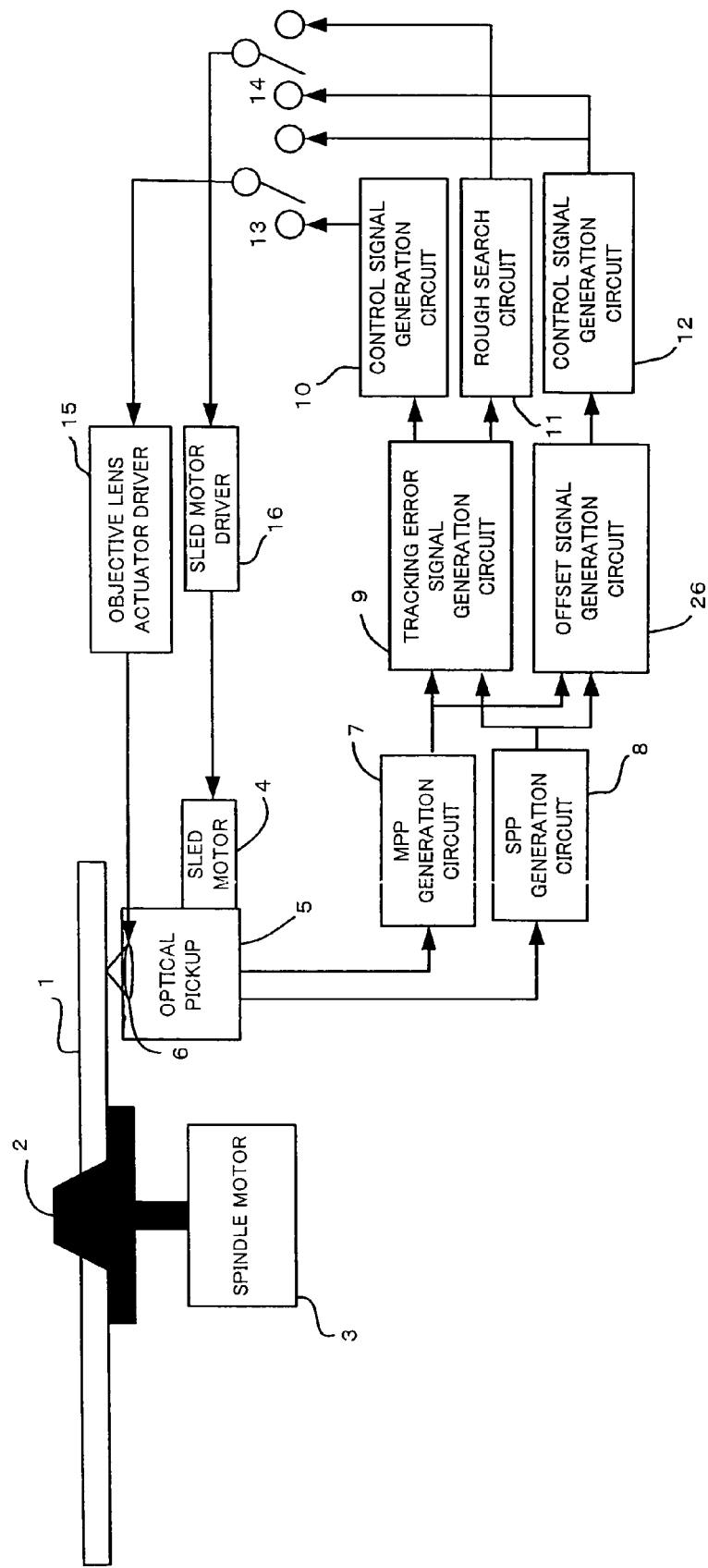
FIG. 5 is a diagram showing the configuration of the optical disk apparatus of a second embodiment of the present invention.

FIG. 5 shows the configuration of the optical disk apparatus using the DPP method of a second embodiment of the present invention. Note that, in the following description, such members as are found also in FIG. 1 (first embodiment) will be identified with common reference numerals. The optical disk apparatus shown in FIG. 5 differs from the optical disk apparatus shown in FIG. 1 in that it is provided with an offset signal generation circuit 26. This embodiment also differs from the first embodiment described above in the method of generating a tracking error signal and a shift signal. In this embodiment, just as in the first embodiment, a main beam and two sub-beams are generated by the diffraction grating inside the optical pickup 5 from the beam emitted from the light source, and then they are condensed by the objective lens 6 on the optical disk 1.

Figure 6A:
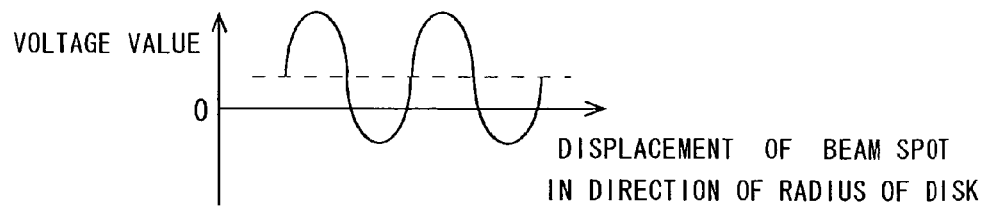
FIG. 6A is a diagram showing a main beam push-pull signal in the DPP method.
Figure 6B:
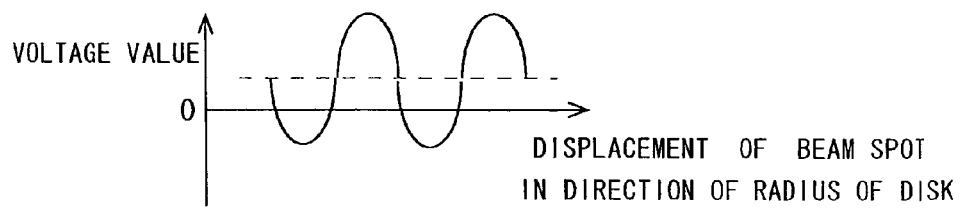
FIG. 6B is a diagram showing a sub-beam push-pull signal in the DPP method.
Figure 6C:
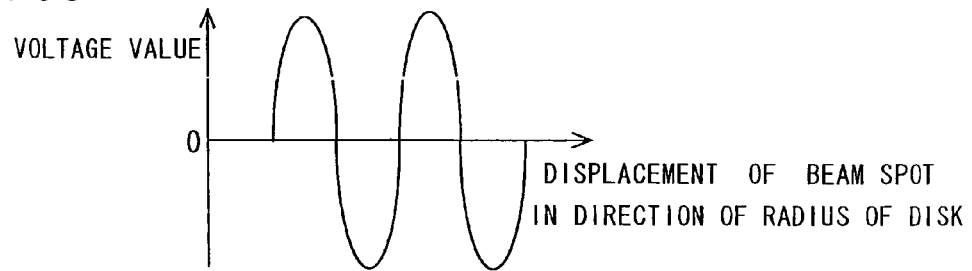
FIG. 6C is a diagram showing a tracking error signal in the DPP method.

Here, the DPP method, which is the distinctive feature of this embodiment, will be described with reference to FIG. 6. Unlike the phase shift DPP method described above, the DPP method does not give a phase difference to part of the sub-beam. In this method, a main beam push-pull signal is generated from the detection signal obtained from the reflected light resulting from a main beam reflected from the optical disk. As shown in FIG. 6A, this main beam push-pull signal is a signal obtained by adding an offset component corresponding to the amount of shift of the objective lens to a tracking error component. On the other hand, a sub-beam push-pull signal is generated from the detection signal obtained from the reflected light resulting from a sub-beam shone onto the optical disk at a position displaced from the position where the main beam is shone by a distance corresponding to half the track pitch. As shown in FIG. 6B, this sub-beam push-pull signal is a signal obtained by adding together a tracking error component that is 180 degrees out of phase with the main beam push-pull signal and an offset component corresponding to the amount of shift of the objective lens. By subtracting the sub-beam push-pull signal from the main beam push-pull signal in a ratio that permits cancellation of the offset component, a tracking error signal shown in FIG. 6C having twice the amplitude of the main beam push-pull signal is generated from which the offset component has been cancelled.

Figure 6D:
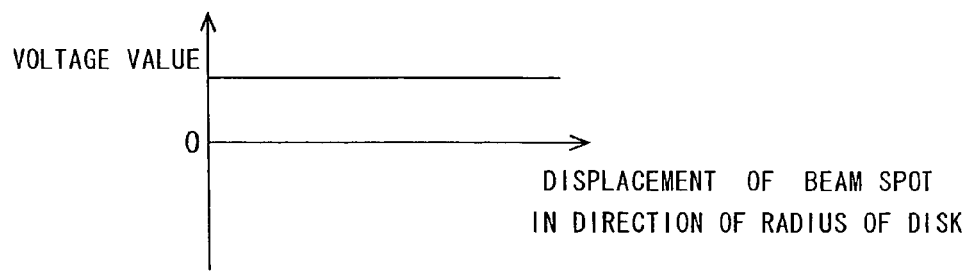
FIG. 6D is a diagram showing a shift signal of the objective lens in the DPP method.

Moreover, by adding the sub-beam push-pull signal to the main beam push-pull signal in the ratio that permits cancellation of the tracking error component, twice the offset of the main beam push-pull signal shown in FIG. 6D is generated. The offset thus generated can be detected as a shift signal of the objective lens. It is to be noted that the ratio in which the sub-beam push-pull signal is added to the main beam push-pull signal depends only on the optical pickup. By contrast, according to what is disclosed in Japanese Patent Application Laid-Open No. S59-84353, for example, the ratio in which a tracking error signal and a signal based on an RF signal are synthesized together depends on the optical disk. Thus, with the method according to the present invention, the accuracy of the shift signal is improved.

With the method described above, a tracking error signal is generated by the tracking error signal generation circuit 9 (FIG. 5) from the main beam push-pull signal generated by the MPP generation circuit 7 (FIG. 5) and the sub-beam push-pull signal generated by the SPP generation circuit 8 (FIG. 5). Furthermore, with the method described above, an offset is generated by the offset signal generation circuit 26 (FIG. 5) from the main beam push-pull signal generated by the MPP generation circuit 7 and the sub-beam push-pull signal generated by the SPP generation circuit 8, and the offset thus generated is detected as a shift signal. In this way, a shift signal is detected from the main beam push-pull signal and the sub-beam push-pull signal that are generated in the course of generating the tracking error signal.

The optical disk apparatus of this embodiment performs the control (including the switching control performed by the switches 13 and 14) using the tracking error signal thus generated and the shift signal thus detected in the same manner as in the first embodiment.

What is claimed is:
1. An optical disk apparatus comprising:
a light source;
an optical pickup having an objective lens that condenses a beam emitted from the light source on an optical disk and an objective lens actuator that drives the objective lens;
a sled mechanism that moves the optical pickup in a direction of a radius of the optical disk;
an optical pickup moving portion that moves the optical pickup in the direction of the radius of the optical disk with the sled mechanism for making access to a target track on the optical disk;
a shift signal detecting portion;
a shift amount control portion;
a memory which stores a predetermined offset, said offset is a shift signal obtained in a state where the amount of displacement of the objective lens from an optical axis of the light source is zero,
wherein the shift signal detecting portion detects a shift signal of the objective lens based on a push-pull signal, among signals based on reflected light resulting from the beam reflected from the optical disk, the push-pull signal generated in a course of generating a tracking error signal based on the reflected light, and wherein, when the optical pickup moving portion operates, the shift amount control portion corrects the shift signal detected by the shift signal detecting portion by use of the offset read from the memory, and drives the objective lens actuator based on the corrected shift signal;

a beam generating portion that generates, from the beam emitted from the light source, a main beam and at least one sub-beam, the main beam and the sub-beam being condensed by the objective lens on the optical disk;

a main beam push-pull signal generating portion that generates, based on reflected light resulting from the main beam reflected from the optical disk, a main beam push-pull signal containing a tracking error component and an offset component;

a sub-beam push-pull signal generating portion that generates, based on reflected light resulting from the sub-beam reflected from the optical disk, a sub-beam push-pull signal containing almost zero tracking error components but containing an offset component; and a tracking error signal generating portion that generates the tracking error signal based on the main beam push-pull signal and the sub-beam push-pull signal, wherein the shift signal detecting portion detects the shift signal based on the sub-beam push-pull signal.

2. The optical disk apparatus of claim 1, further comprising:
    a tracking control portion that performs tracking control by driving the objective lens actuator based on the tracking error signal; and
    a switching portion that switches between the shift amount control portion and the tracking control portion.

3. The optical disk apparatus of claim 1, further comprising:
    a tracking control portion that performs tracking control by driving the objective lens actuator based on the tracking error signal,
    wherein, when the tracking control is performed, the sled mechanism is driven based on the shift signal.

4. The optical disk apparatus of claim 2, further comprising:
    a tracking control portion that performs tracking control by driving the objective lens actuator based on the tracking error signal,
    wherein, when the tracking control is performed, the sled mechanism is driven based on the shift signal.

* * * * *